(12) United States Patent
Hunzinger et al.

(10) Patent No.: US 6,748,217 B1
(45) Date of Patent: Jun. 8, 2004

(54) RAPID ACQUISITION AND SYSTEM SELECTION OF MOBILE WIRELESS DEVICES USING A SYSTEM MAP

(75) Inventors: Jason F. Hunzinger, Carlsbad, CA (US); Robert Yamaguchi, San Diego, CA (US)

(73) Assignee: Denso Corporation, Kariya (JP)

( * ) Notice: Subject to any disclaimer, the term of this patent is extended or adjusted under 35 U.S.C. 154(b) by 0 days.

(21) Appl. No.: 09/476,301

(22) Filed: Dec. 30, 1999

(51) Int. Cl.[7] ................................. H04Q 7/20
(52) U.S. Cl. ............... 455/435.2; 455/456.6; 455/432.1
(58) Field of Search ................. 455/422, 432, 455/436, 440, 441, 437, 445, 450, 456, 524, 435.1, 435.2, 435.3, 456.1, 456.6, 432.1; 701/28

(56) References Cited

U.S. PATENT DOCUMENTS

| | | | | | |
|---|---|---|---|---|---|
| 4,750,123 A | * | 6/1988 | Christian | ............... | 701/28 |
| 5,586,338 A | * | 12/1996 | Lynch et al. | ............... | 455/433 |
| 5,926,761 A | * | 7/1999 | Reed et al. | ............... | 455/440 |
| 5,974,328 A | * | 10/1999 | Lee et al. | ............... | 455/168.1 |
| 6,061,561 A | * | 5/2000 | Alanara et al. | ............... | 455/422 |
| 6,208,857 B1 | * | 3/2001 | Agre et al. | ............... | 455/428 |
| 6,397,072 B1 | * | 5/2002 | Peters et al. | ............... | 455/414 |

* cited by examiner

Primary Examiner—Marsha D. Banks-Harold
Assistant Examiner—James Moore
(74) Attorney, Agent, or Firm—Harness, Dickey & Pierce, PLC

(57) ABSTRACT

The present invention enhances service system selection by a mobile unit in a wireless communication system. The mobile unit determines its geographic position, and based on that position selects the proper service system. The geographic position may be determined using a global position system, dead reckoning, or estimated from a last known position. The distance of varying service systems from the mobile station can then be calculated and a service system selected based on this distance. The mobile station may also use the position information in combination with a database including position information of service systems to select the proper service system. The position information of the service systems can be included in the system selection database. The mobile station may also map service systems based on position information and service availability. The mobile station can then subsequently refer to these maps to estimate available service.

10 Claims, 5 Drawing Sheets

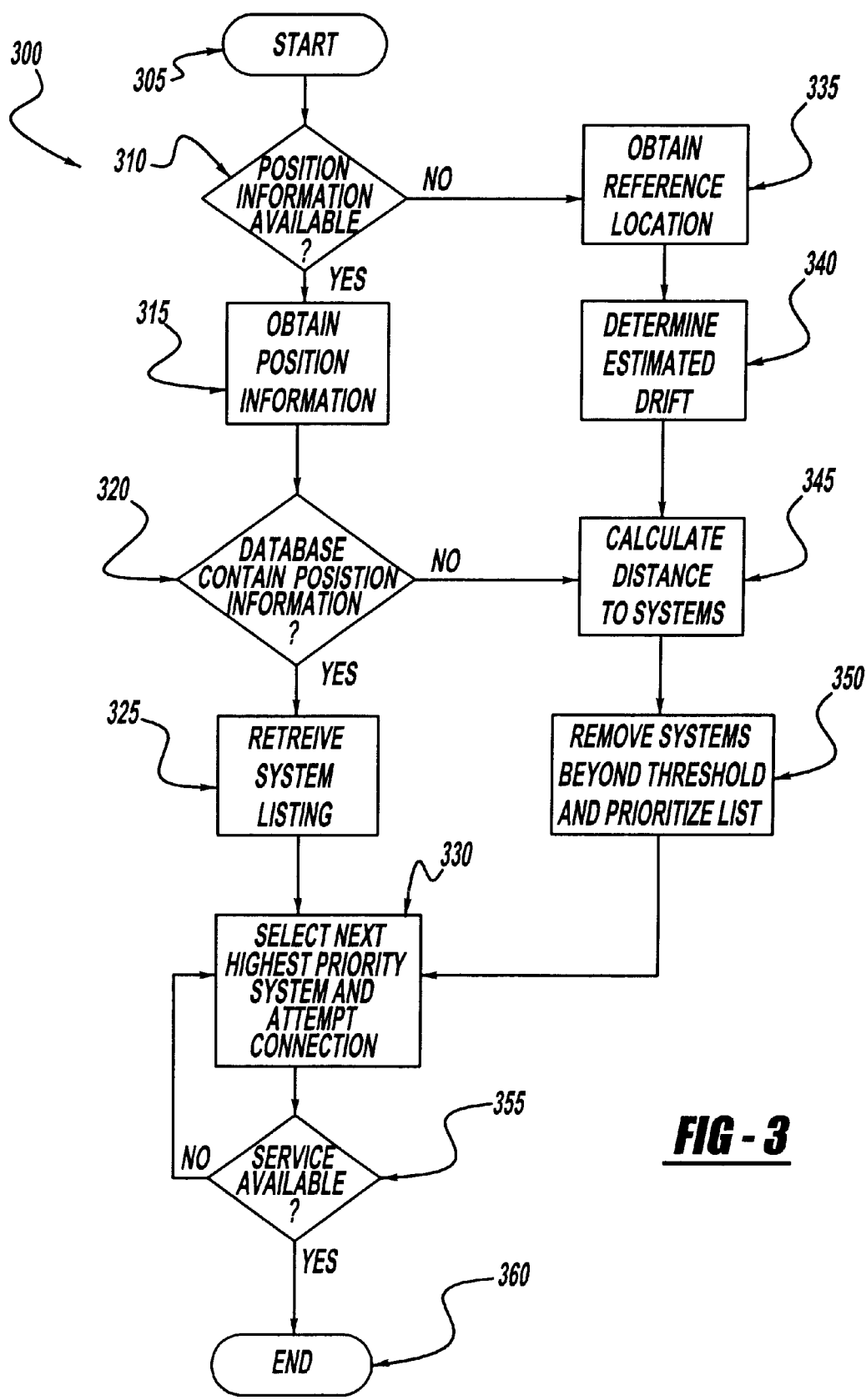

RAPID ACQUISITION AND SYSTEM SELECTION OF MOBILE WIRELESS DEVICES USING A SYSTEM MAP

TECHNICAL FIELD

This invention relates to wireless communication systems, and more particularly to cellular carrier selection within wireless communication systems.

BACKGROUND

The use of wireless communication systems is growing with users now numbering well into the millions. One of the popular wireless communications systems is the cellular telephone, having a mobile station (or handset) and a base station. Cellular telephones allow a user to talk over the telephone without having to remain in a fixed location. This allows users to, for example, move freely about the community while talking on the phone.

Cellular telephones may operate under a variety of standards including the code division multiple access (CDMA) cellular telephone communication system as described in TIA/EIA, IS-95, Mobile station-Base Station Compatibility Standard for Dual-Mode Wideband Spread Spectrum Cellular System, published July 1993. CDMA is a technique for spread-spectrum multiple-access digital communications that creates channels through the use of unique code sequences. In CDMA systems, signals can be and are received in the presence of high levels of interference. The practical limit of signal reception depends on the channel conditions, but CDMA reception in the system described in the aforementioned IS-95 Standard can take place in the presence of interference that is 18 dB larger than the signal for a static channel. Typically, the system operates with a lower level of interference and dynamic channel conditions.

A cellular telephone communication system typically provides services to an area by dividing the area into many smaller geographic areas, known as cells, each of which is serviced by a transmitter-receiver station, known as a cell site. The cell sites are connected through landlines, or other communication links, to so-called mobile telephone switching offices (MTSO's) which are, in turn, connected to the public switched telephone network (PSTN). According to current FCC rules, any given area is serviced by up to two competing providers of cellular airtime communication services (i.e., cellular carriers). The two service providers in any given geographic area, commonly referred to as "A" and "B" carriers, are assigned different groups of frequencies, or frequency sets, through which services are provided along paging, control, access, and voice channels, as would be understood by those reasonably skilled in the industry and as dictated by technical standards of appropriate regulatory agencies.

When a mobile station first activates in a particular area, the mobile station searches for available service systems. Based on the service subscription and other factors, the mobile station has a preference when selecting a service system. The mobile station generally looks for a system supported by the subscriber, and if none if available the mobile system searches for a compatible system. At present, the mobile station simply searches for systems regardless of the geographic location of the mobile station. What is desired is a system where the mobile station can limit the number of systems required for searching based on the geographic position of the mobile station.

SUMMARY

The present invention enhances service system selection by a mobile unit in a wireless communication system. The mobile unit determines its geographic position, and based on that position selects the proper service system. The geographic position may be determined using a global position system, deck reckoning, or estimated from a last known position. The distance of varying service systems from the mobile station can then be calculated and a service system selected based on this distance. The mobile station may also use the position information in combination with a database including position information of service systems to select the proper service system. The position information of the service systems can be included in the system selection database. The mobile station may also map service systems based on position information and service availability. The mobile station can then subsequently refer to these maps to estimate available service.

One aspect of the invention is a method of prioritizing a plurality of service systems in a wireless communication system. The method comprises determining a reference location and calculating a distance from the reference location to each of the plurality of service systems. The method the prioritizes the plurality of service systems based on the distance from the reference location. The reference location may be determined using a global positioning system or dead reckoning, among other techniques. The calculating step further comprises determining a drift term and adjusting the reference location based on the drift term.

Another aspect of the invention is a method of prioritizing a plurality of service systems in a wireless communication system. The method comprises determining a reference location and obtaining a prioritized list of service systems based on the reference location. The reference location may be determined using a global positioning system or dead reckoning. The prioritized list of service systems based on the reference location is obtained from stored data within a mobile station. The data may be stored in the system selection database. The system selection database includes a position reference for each of the plurality of service systems.

Another aspect of the invention is a mobile station for use in a wireless communication system. The mobile station comprises a position determination device and a database of system providers based on position information. The position determination device may be a global positioning system. The database is included in the system selection database, and the selects one of the system providers based on the database information.

Another aspect of the invention is a mobile station for use in a wireless communication system. The mobile station comprises a position determination device and a service detector. The service detector determines if service is available at any given position. The mobile station includes memory locations for storing data regarding service availability for a plurality of locations. A grouping of the memory locations provides a map of a service area showing service availability. The grouping of memory locations containing position information can be converted to a formula defining a service area. Each memory location stores both a latitude and a longitude of a position along with information indicating whether service was available at the position.

Another aspect of the invention is a method of mapping a service system for a wireless communication system. The method comprises establishing a reference location and determining service availability for the reference location. Information on service availability for the reference location is then stored. The method further comprises collecting data on service information for a plurality of reference locations and combining the data to provide a map of a service area showing service availability. The combined data may be converted into a formula defining a service area.

DESCRIPTION OF DRAWINGS

These and other features and advantages of the invention will become more apparent upon reading the following detailed description and upon reference to the accompanying drawings.

FIG. 3 is a flowchart illustrating the system selection process according to the present invention.

DETAILED DESCRIPTION

Figure 1:
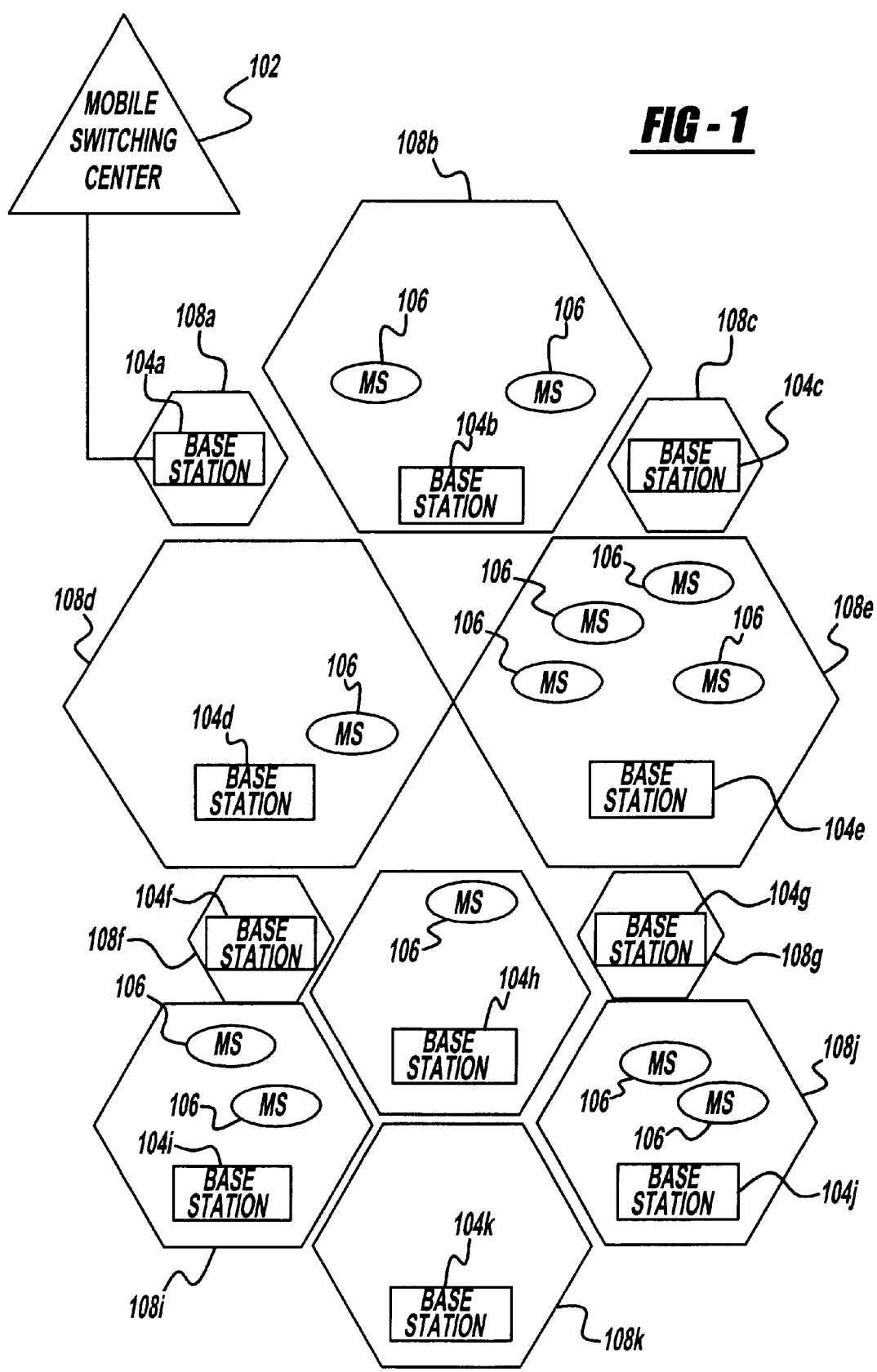
FIG. 1 illustrates the components of an exemplary wireless communication system used by the present invention.

FIG. 1 illustrates components of an exemplary wireless communication system. A mobile switching center 102 communicates with base stations 104a–104k (only one connection shown). The base stations 104a–104k (generally 104) broadcasts data to and receives data from mobile stations 106 within cells 108a–108k (generally 108). The cell 108 is a geographic region, roughly hexagonal, having a radius of up to 35 kilometers or possibly more.

A mobile station 106 is capable of receiving data from and transmitting data to a base station 104. In one embodiment, the mobile station 106 receives and transmits data according to the Code Division Multiple Access (CDMA) standard. CDMA is a communication standard permitting mobile users of wireless communication devices to exchange data over a telephone system wherein radio signals carry data to and from the wireless devices.

Under the CDMA standard, additional cells 108a, 108c, 108d, and 108e adjacent to the cell 108b permit mobile stations 106 to cross cell boundaries without interrupting communications. This is so because base stations 104a, 104c, 104d, and 104e in adjacent cells assume the task of transmitting and receiving data for the mobile stations 106. The mobile switching center 102 coordinates all communication to and from mobile stations 106 in a multi-cell region. Thus, the mobile switching center 102 may communicate with many base stations 104.

Mobile stations 106 may move about freely within the cell 108 while communicating either voice or data. Mobile stations 106 not in active communication with other telephone system users may, nevertheless, scan base station 104 transmissions in the cell 108 to detect any telephone calls or paging messages directed to the mobile station 106.

One example of such a mobile station 106 is a cellular telephone used by a pedestrian who, expecting a telephone call, powers on the cellular telephone while walking in the cell 108. The cellular telephone scans certain frequencies (frequencies known to be used by CDMA) to synchronize communication with the base station 104. The cellular telephone then registers with the mobile switching center 102 to make itself known as an active user within the CDMA network.

When detecting a call, the cellular telephone scans data frames broadcast by the base station 104 to detect any telephone calls or paging messages directed to the cellular telephone. In this call detection mode, the cellular telephone receives, stores and examines paging message data, and determines whether the data contains a mobile station identifier matching an identifier of the cellular telephone. If a match is detected, the cellular telephone establishes a call with the mobile switching center 102 via the base station 104. If no match is detected, the cellular telephone enters an idle state for a predetermined period of time, then exits the idle state to receive another transmission of paging message data.

When a mobile station 106 activates, the mobile station 106 searches for an active and desirable wireless communication system. Different areas may be served by multiple wireless communication systems, and depending on the selected service provider and other factors, the mobile station 106 selects which system to operate within. The present invention provides a means to use location information to enhance proper system selection. The invention defines a system selection map and system selection algorithm that use the map to optimize the service acquisition process.

Figure 2:
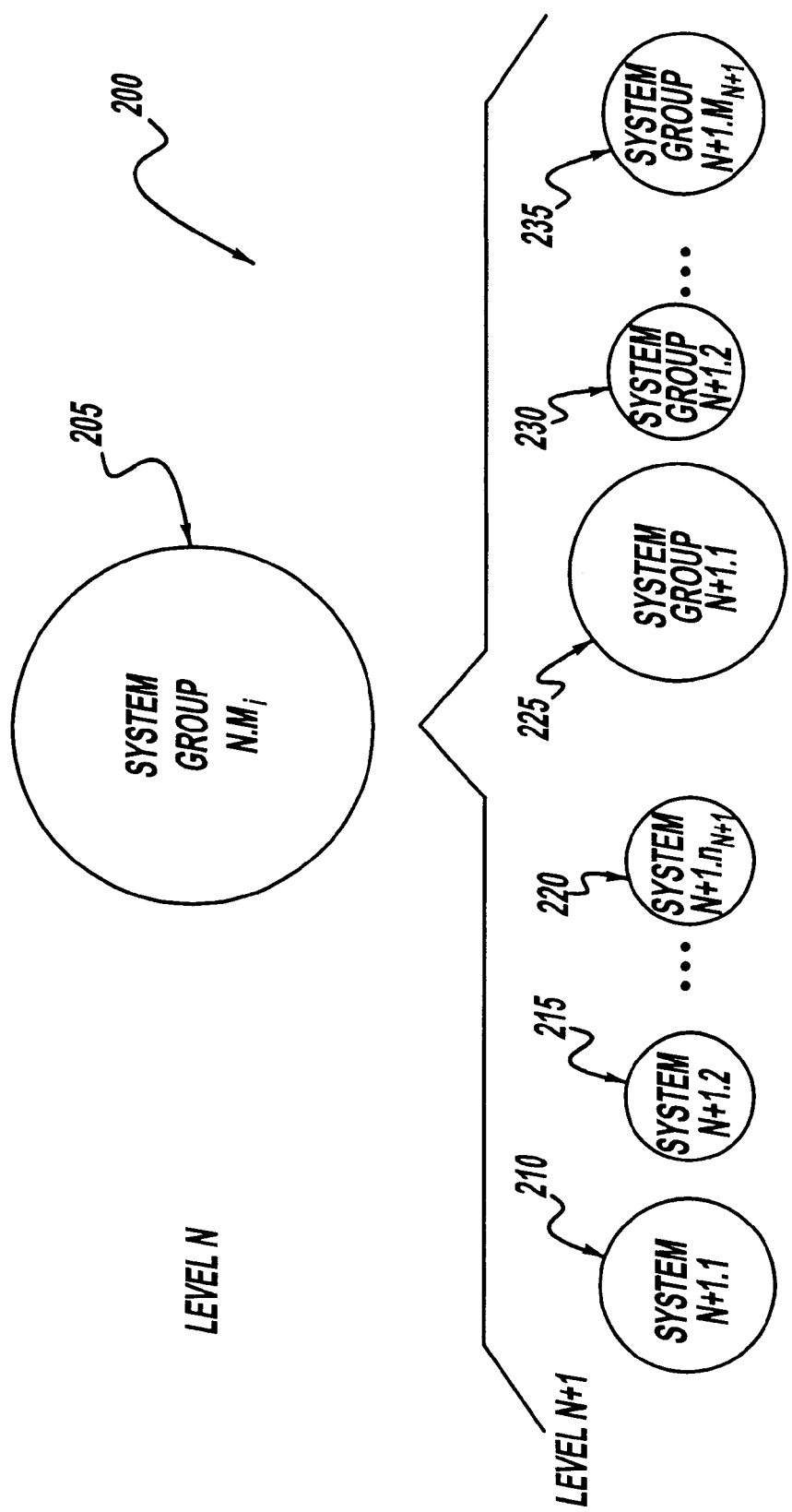
FIG. 2 illustrates the system selection map structure according to the present invention.

The area covered by a wireless communication system can generally be approximated with system circles or other shapes. Each system may be defined by one or more circles which, when combined, approximate the general service area of the system. Each of the system circles may be defined by a the system circle longitude (longitude$_s$), and the radius of the system circle (radius$_s$). As shown in FIG. 2, a system selection map may contain varying levels, and the varying levels may be diagramed in a system tree 200. The system tree 200 shows a system selection map having two levels (level N and level N+1). In level N, the system tree 200 has a system group M$_i$ 205. In level N+1, the system group M$_i$ 205 of FIG. 2 has a plurality of child system nodes including a child system {N+1.1} 210, a child system {N+1.2} 215, and other child systems until child system {N+1.n$_{N+1}$} 220. The system group M$_i$ 205 of FIG. 2 also has a plurality of child system group nodes including a child system group {N+1.1} 225, a child system group {N+1.2} 230, and other child systems groups until child system group {N+1.M$_{N+1}$} 220. Each of the child systems groups may have its own child systems or child system groups. Of course, the system group M$_i$ 205 may also have no child systems or no child system groups.

The system group M$_i$ 205, each of the child systems 210, 215, 220, and each of the child system groups 225, 230, 235 are generally defined as a circle having a centerpoint and a radius. The centerpoint of each circle may be defined by a corresponding set of coordinate points {latitude$_s$, longitude$_s$}. As depicted in FIG. 2, the radius of each system and system group may vary. The system group M$_i$ 205 encompasses, at a minimum, the centerpoint of each child node. The system group M$_i$ 205 may also encompass the majority of the child nodes, or completely encompass the child nodes.

The present invention uses a reference location {latitude$_r$, longitude$_r$} for the mobile station 106 to enhance the system selection process. The process 300 of using position information to enhance system selection is shown in FIG. 3. The process begins at a start state 305. Proceeding to state 310, the mobile station 106 determines if the position information is available. The position information may be available to the mobile station 106 from a variety of sources, including a global positioning system (GPS), base station triangulation, dead reckoning, and any other positioning system that is well known in the art. If the position information is available, the process 300 proceeds along the YES branch to state 315. At state 315, the mobile station 106 obtains the position information. The position information is stored as the reference location $\{latitude_r, longitude_r\}$.

Proceeding to state 320, the mobile station 106 determines if the system selection database contains position information. The system selection database provides the mobile station 106 with information for the user zones to which the mobile station 106 is subscribed. The system selection database contains information on user zone priority, user zone identification, user zone system identification, user zone name, active flag, priority control field, notification flag, user zone revision, and overhead parameters. According to the present invention, an additional field is inserted into the system selection database containing position information. The position information can be listed with each entry in the system selection database, or may be included only for each group of listings. By including position information in the system selection database, the mobile station 106 can use the position information of the mobile station 106 combined with the position information in the system selection database to determine the most desirable system. If the system selection database does not contain any position information, the process 300 proceeds along the NO branch to state 345, which will be described below. If the system selection database does contain position information, the process 300 proceeds to state 325.

In state 325, the mobile station 106 retrieves the system listings from the system selection database. Based on the position information, the mobile station 106 can classify each of the systems with a priority level, with the system having the highest priority being the most desirable system and the first system with which the mobile station 106 attempts to connect.

Returning to state 310, if position information is not available, the process 300 proceeds along the NO branch to state 335. In state 335, the mobile station 106 determines a reference location $\{latitude_r, longitude_r\}$. The reference location is an approximation of the position of the mobile station 106, and may be the last known position available, any nearby or recently communicated infrastructure location, the last known system circle centerpoint, or any other position information that may be available to the mobile station 106.

Proceeding to state 340, the mobile station 106 determines an estimated drift factor (radius$_d$). The drift factor is used when timing information is available and no system has been available for a significant amount of time. If timing information is not available, the drift factor (radius$_d$) is set to 0. The drift factor can be calculated using the formula:

$$radius_d = (t - t_{last\text{-}system}) V_{max}$$

where t is the current time, $t_{last\text{-}system}$ is the time that service was last available on the last known system, and $V_{max}$ is the maximum expected velocity that the mobile station 106 would travel during the period without service.

Proceeding to state 345, the mobile station 106 calculates the distance to each available system ($d_{sys(n)}$). As stated above, the location of each system is defined by a set of coordinate points $\{latitude_s, longitude_s\}$. The mobile station 106 uses the reference location and the drift factor to determine the distance to each available system ($d_{sys(n)}$) according to the following formula:

$$d_{sys} = \frac{\sqrt{(latitude_s - latitude_r) + (longitude_s - longitude_r)}}{radius_s + radius_d}$$

The distance ($d_{sys(n)}$) is calculated for each available system.

Proceeding to state 350, the mobile station 106 disregards any systems located beyond a threshold distance ($d_{sys(n)} > d_{threshold}$). The threshold distance ($d_{threshold}$) may be predetermined or the mobile station 106 may calculate the threshold distance ($d_{threshold}$) based on prior performance. Of course, if it is desired for the mobile station 106 to consider all available systems, the threshold distance may be ignored. After any systems beyond the threshold distance are removed, the mobile station 106 prioritizes the remaining systems. Prioritization of the systems is well known in the art and will not be described herein.

Proceeding to state 330, the mobile station selects the highest priority system and attempts to connect to that system. The system is chosen from either the list generated from the system selection database information or the list calculated by the mobile station 106.

Proceeding to state 355, the mobile station 106 determines if service is available on the selected system. If service is available, the mobile unit 106 connects with the service and the process 300 proceeds along the YES branch to an end state 360. Returning to state 355, if service is not available, the process 300 proceeds along the NO branch back to state 330, where the next highest priority system is selected and connection attempted. This process is repeated until the mobile station 106 connects to a system, at which point the process 300 terminates in the end state 360.

The present invention may also use the position information to create a map of serving systems within the mobile station 106. The map may be used to determine the likelihood of service being available from any particular system at any geographic location. When a mobile station 106 obtains service, it can begin to map the service area. The current position information (which may be stored as a $\{latitude, longitude\}$), along with the service information is recorded within the mobile station 106. The more a mobile station 106 travels within a service area, the more detailed the map.

Figure 4A:
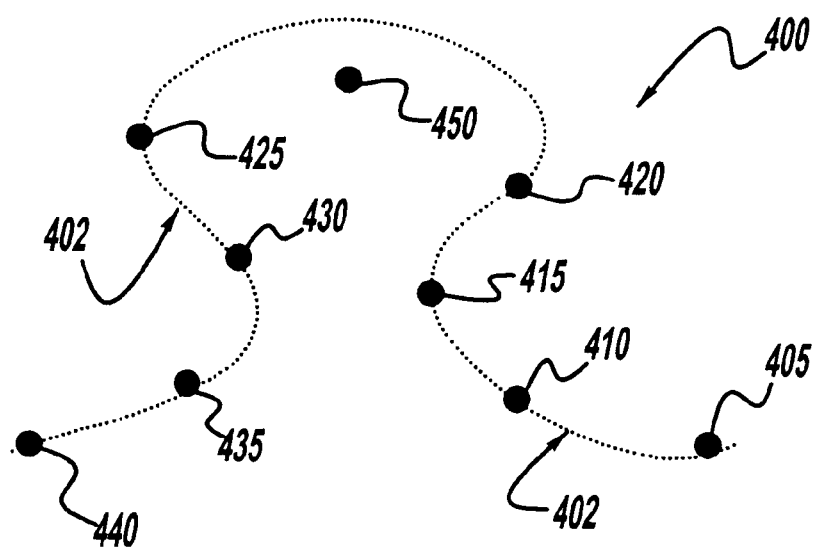
FIG. 4A illustrates a first system map according to the present invention.

FIG. 4A illustrates a map 400 according to one embodiment of the present invention. The map 400 illustrates a service area 402 defined by a series of points 405, 410, 415, 420, 425, 430, 435, and 440. Each of the series of points 405, 410, 415, 420, 425, 430, 435, and 440 is recorded by the mobile station 106 by recording the $\{latitude, longitude\}$ of each point along with the information that service is available at that point. In general, it is not necessary to map points inside the service area, as those points would be assumed to have service. However, if an area inside a service area does not have service, that information may also be mapped as will be discussed below. After a service area is mapped, it may be possible to condense the map 400 down from a number of points to an equation defining the map 400. For example, if the service area generally defined a circular area, the map 400 may be condensed to a centerpoint and a radius. By condensing the map 400 to an equation, the amount of memory required to store the map 400 within the mobile station 106 is reduced.

As shown in FIG. 4, there may be areas within a service map 400 such as a point 450 that are within the service area, but the map 400 may not completely define. For example, in FIG. 4, the point 450 is within the service area 402, but because only the points 420 and 425 define the outer perimeter of the service area, the mobile station 106 cannot accurately predict whether service is available at the point 450. One technique that may be used to enhance the accuracy of the mobile station 106 is to include a confidence factor. The confidence factor is a measure of how definite the mobile station 106 is that the current location has service, and may range for example from 0 (not confident) to 1 (extremely confident). If a mobile station 106 is in an area that has not been mapped, the confidence factor for that area would be 0. If the mobile station 106 looks for service in at an exact location it had service before, the confidence factor would be 1.

Figure 4B:
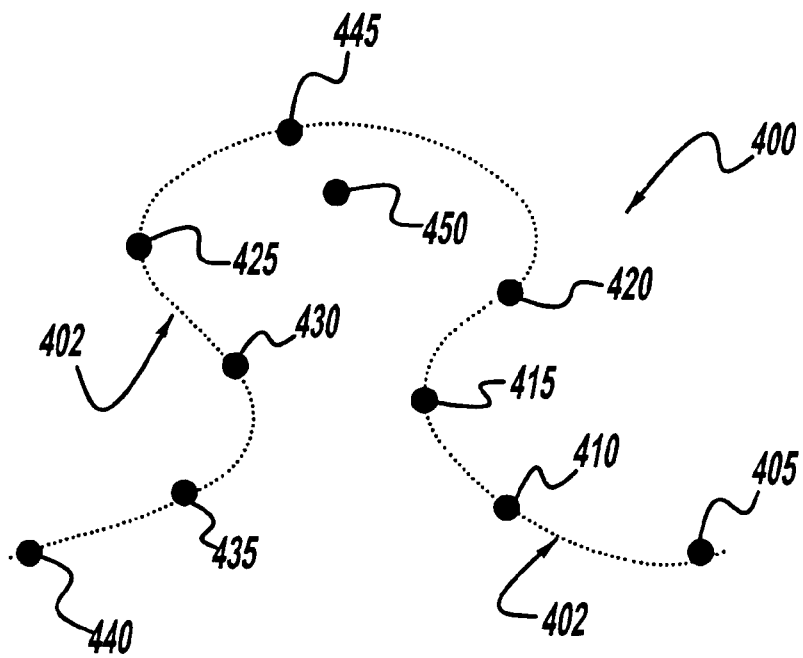
FIG. 4B illustrates a second system map according to the present invention.

In FIG. 4A, the series of points 405, 410, 415, 420, 425, 430, 435, and 440 define the service area 402. However, because no points have been recorded at the top of the arc, that shape can only be approximated. Therefore, if service is desired at the point 450, the mobile station 106 would assign a relatively low confidence factor that service is available at that point. However, if the mobile station 106 records data at an additional point 445 as shown in FIG. 4B, the service area 402 becomes better defined. Therefore, the mobile station 106 can now assign a higher confidence factor to the point 450.

Figure 5:
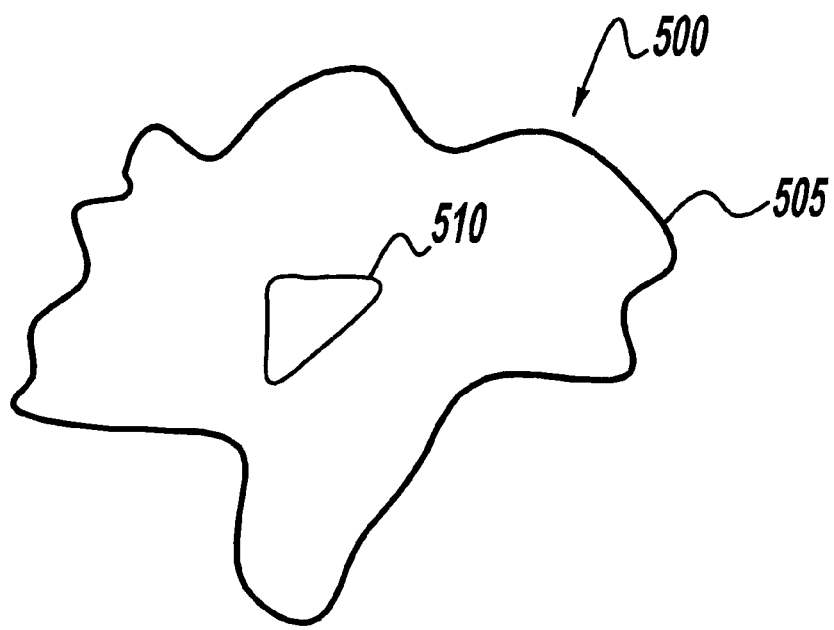
FIG. 5 illustrates an exemplary system map having an exclusion area according to the present invention.

Some areas located within a service area may not have coverage available or may have poor coverage. This may happen for a variety of reasons, including entering a tunnel, encountering natural obstacles such as hills, or entering the basement of a building. FIG. 5 illustrates a service map 500 having a service area 505. The service area 505 generally defines the geographic area where service may be expected to be available. In general, any points within the service area 505 would have a high confidence factor. However, the service area 505 may include an exclusion area 510. The exclusion area 510 defines an area within the service area 505 where the mobile station 106 has determined that either no service is available, or the service is weak. The exclusion area 510 may also define that service is only available for a certain operating mode. For example, digital service may not be available in the exclusion area 510 but service may be available on an analog network.

Figure 6:
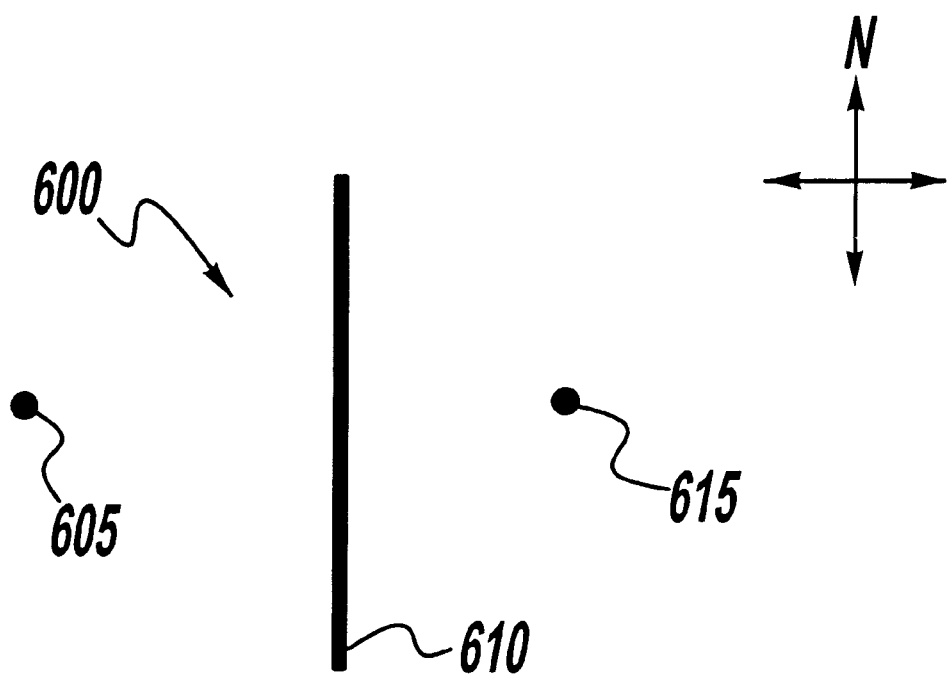
FIG. 6 illustrates an exemplary system map showing a coverage boundary which is mapped according to the present invention.

The use of mapping and the confidence factor may be used to predict the availability of service when the mobile station 106 moves a long distance between measured points. FIG. 6 illustrates a service map 600 having a point 605 where service is available. The service boundary is indicated by a line 610. If the mobile station 106 is turned off at the point 605, no further mapping occurs. As the mobile station 106 travels east from the point 605, the mobile station 106 will pass the service boundary. If the mobile station 106 is turned on again at a point 615 where no service is available, the mobile station 106 will not know at what point service is lost. However, the mobile station 106 does know that service is available at the point 605, so as the mobile station travels west, the confidence factor is increased. Of course, the mobile station 106 is continually mapping new points to enhance the mapping area stored in memory.

Numerous variations and modifications of the invention will become readily apparent to those skilled in the art. Accordingly, the invention may be embodied in other specific forms without departing from its spirit or essential characteristics. The detailed embodiment is to be considered in all respects only as illustrative and not restrictive and the scope of the invention is, therefore, indicated by the appended claims rather than by the foregoing description. All changes which come within the meaning and range of equivalency of the claims are to be embraced within their scope.

What is claimed is:

1. A method of prioritizing a plurality of service provider networks in a wireless communication system comprising:
   determining a reference location;
   calculating a distance from the reference location to each of the plurality of service provider networks based on service provider network coverage information stored at a mobile station;
   prioritizing the plurality of service provider networks based on the reference location and the distance from the reference location; and
   selecting one of the plurality of service provider networks based on the priority.

2. The method of claim 1, wherein the reference location is determined using a global positioning system.

3. The method of claim 1, wherein the reference location is determined using dead reckoning.

4. The method of claim 1, wherein the reference location is a last known location of a mobile station.

5. The method of claim 1, wherein the calculating step further comprises:
   determining a drift term; and
   adjusting the reference location based on the drift term.

6. The method of claim 5, wherein the drift term is determined using the equation:

$$\text{radius}_d = (t - t_{last\text{-}system}) V_{max}$$

where $t$ is a current time, $t_{last\text{-}system}$ is a time that service was last available on a last known system, and $V_{max}$ is a maximum expected velocity that a mobile station would travel during the period without service.

7. The method of claim 1, further comprising:
   determining a carrier for each of the plurality of service provider networks;
   prioritizing the plurality of service provider networks based on the carrier.

8. A method of prioritizing a plurality of service provider networks in a wireless communication system comprising:
   determining a reference location;
   obtaining a prioritized list of service provider networks based on the reference location; and
   selecting one of the plurality of service provider networks based on the prioritized list; wherein
      the prioritized list of service provider networks based on the reference location is obtained from stored data within a mobile station;
      the data is stored in a service provider network selection database; and
      the service provider network selection database includes a position reference for each of the plurality of service provider networks.

9. The method of claim 8, wherein the reference location is determined using a global positioning system.

10. The method of claim 8, wherein the reference location is determined using dead reckoning.

* * * * *